(12) United States Patent
Wei

(10) Patent No.: US 10,914,872 B2
(45) Date of Patent: Feb. 9, 2021

(54) LENS ASSEMBLY AND LENS MODULE USING SAME

(71) Applicant: Chuandong Wei, Shenzhen (CN)

(72) Inventor: Chuandong Wei, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 173 days.

(21) Appl. No.: 15/677,075

(22) Filed: Aug. 15, 2017

(65) Prior Publication Data

US 2018/0299592 A1  Oct. 18, 2018

(30) Foreign Application Priority Data

Apr. 15, 2017  (CN) .................... 2017 2 0398120 U

(51) Int. Cl.
| | | |
|---|---|---|
| *G02B 9/00* | (2006.01) | |
| *G02B 9/08* | (2006.01) | |
| *G02B 5/00* | (2006.01) | |
| *G02B 7/02* | (2021.01) | |
| *G02B 27/00* | (2006.01) | |

(52) U.S. Cl.
CPC .............. *G02B 5/003* (2013.01); *G02B 7/021* (2013.01); *G02B 27/0018* (2013.01)

(58) Field of Classification Search
CPC . G02B 1/11; G02B 1/16; G02B 5/003; G02B 5/0294; G02B 5/22; G02B 6/243; G02B 6/353; G02B 6/4207; G02B 7/021; G02B 27/0018; G02B 27/0025; G02B 2006/12126; G02B 1/00; C03C 23/00
USPC ............... 359/356, 428, 738, 741, 819, 601; 348/374, 241; 313/534; 65/32.2, 37; 427/162
See application file for complete search history.

(56) References Cited

U.S. PATENT DOCUMENTS

| | | | | |
|---|---|---|---|---|
| 5,078,773 A | * | 1/1992 | Thomas .................. | C03C 23/00 313/534 |
| 2009/0155921 A1 | * | 6/2009 | Lu ......................... | G01N 21/274 436/164 |
| 2015/0103407 A1 | * | 4/2015 | Chen ....................... | G02B 1/11 359/601 |
| 2016/0299336 A1 | * | 10/2016 | Hsieh .................. | G02B 27/0018 |
| 2017/0227735 A1 | * | 8/2017 | Chou .................. | G02B 13/0045 |

* cited by examiner

*Primary Examiner* — Mustak Choudhury
(74) *Attorney, Agent, or Firm* — IPro, PLLC; Na Xu

(57) ABSTRACT

The present disclosure provides a lens assembly. The lens assembly, includes at least one lens having a central part used for imaging and an edge part around the central part; and a shading unit in the at least one lens. The edge part depresses from an image side surface to an object side surface and forms a concave part for positioning the shading unit. In addition, the present disclosure further discloses a lens module including the lens assembly mentioned above.

7 Claims, 1 Drawing Sheet

LENS ASSEMBLY AND LENS MODULE USING SAME

FIELD OF THE PRESENT DISCLOSURE

The present disclosure relates to imaging technologies, especially to a lens assembly and a lens module using the lens assembly.

DESCRIPTION OF RELATED ART

A lens module includes a lens barrel and a plurality of lenses and a shading unit set in the lens barrel. A shading element usually is set in an image side surface or an object side surface of the lens used for absorbing and reflecting stray light. When light reflects into lens barrel and passes through lens, the light will refract and change the travel path. When light refract in the shading unit, this part of stray light will be adsorbed by the shading unit. But partial stray light without being absorbed by shading unit will be left to travel in the lens repeatedly, and then it will cause the poor imaging quality of lens module.

Therefore it is necessary to provide an improved lens assembly and a lens module for overcoming the above-mentioned disadvantages.

BRIEF DESCRIPTION OF THE DRAWINGS

Many aspects of the exemplary embodiment can be better understood with reference to the following drawing. The components in the drawing are not necessarily drawn to scale, the emphasis instead being placed upon clearly illustrating the principles of the present disclosure.

DETAILED DESCRIPTION OF THE EXEMPLARY EMBODIMENT

Figure 1:
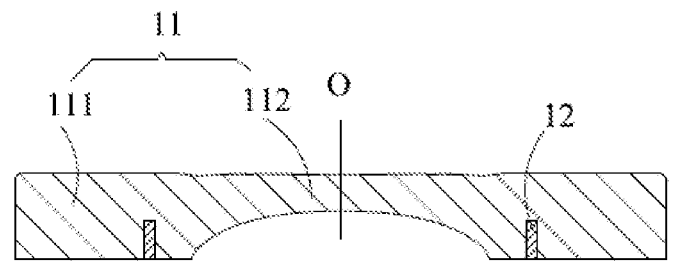
FIG. 1 is an illustrative cross-sectional view of a lens assembly in accordance with an exemplary embodiment of the present disclosure.

The present disclosure will hereinafter be described in detail with reference to an exemplary embodiment. To make the technical problems to be solved, technical solutions and beneficial effects of the present disclosure more apparent, the present disclosure is described in further detail together with the figure and the embodiment. It should be understood the specific embodiment described hereby is only to explain the disclosure, not intended to limit the disclosure.

The present disclosure provides a lens assembly 1. The lens assembly 1 can be applied in an imaging element such as lens module. The lens assembly 1 includes at least one lens 11. Each lens 11 includes a central part used 112 for imaging and an edge part 111 set around the central part 112. Generally, when the lens assembly 1 is installed in lens barrel, the edge part 111 of the lens 11 generally is sheltered by the object with shading function to be used for absorbing the stray light in the lens assembly 1. However the central part 112 is used for light to pass through to realize the imaging function of the lens module.

In order to reduce the stray light in the lens assembly 1 and improve the imaging quality of the lens module, the optimized lens assembly 1 in the present disclosure also includes shading unit 12. The shading unit 12 is embedded in the edge part 111 of the at least one lens 11. Generally, the edge part 111 depresses from an image side surface to an object side surface and forms concave part 1110. The shading unit 12 is set in the concave part 1110.

According to the above description, setting a shading unit 12 in an edge part 111 of lens 11 can let partial stray light to be absorbed through the shading unit 12 to reduce the stray light in the lens assembly 1 and improve the imaging quality of lens module.

It should be noted that the present disclosure does not define the form and structure of shading elements 12. For example, the shading elements 12 can be column structure and plated structure as well. The shading elements 12 can also include several parts scattered and set spacedly.

Optionally, a shading unit 12 can be configured as stripe structure. The direction of length of the shading unit 12 is parallel to an optical axis of lens assembly 1. Namely, the shading unit 12 in fact extends along the direction of the thickness of a lens 11.

Optionally, the shading unit 12 is one circular structure formed continuously around an optical axis O of the lens assembly 1. After being set in this way, the shading unit 12 of circular structure is enclosed around the optical axis O. When light passes through the part close to optical axis O, the stray light refracted from lens 11 to all directions can be absorbed effectively through the shading unit 12 of circular structure. The stray light in lens assembly 1 is reduced further.

When the structure of the shading unit 12 is set as the above circular structure, the shading unit 12 extends from the image side surface of the lens 11 to an object side surface along the direction parallel to optical axis O. The plan is convenient to embed the shading unit 12 into the lens 11.

Further, in order to utilize the shading unit 12 more effectively, in the embodiment, the axis of the shading unit 12 is set to be co-linear with optical axis O. The shading unit 12 is set in the edge part 111 close to one side of optical axis O.

It is understandable, the shading unit 12 can use metal shading unit or plastic shading unit. The intensity of the metal shading unit is high and failure probability is small. As far as the metal shading unit is concerned, darkening process can be done to metal shading unit further to make it become black shading unit to strength the ability of absorbing stray light. As far as the plastic shading unit is concerned, plastic shading unit is easy to shape and light-weight and can be made by using black plastics to process. The ability of absorbing light of the black plastics is stronger. The effect of eliminating light is more obvious.

In the present disclosure, the lens 11 and the shading unit 12 can be connected by the ways of clamping and bonding. In the present disclosure, the optimized lens 11 becomes one integral forming with the shading unit 12. The processing technology can guarantee that the lens 11 and the shading unit 12 are connected more firmly. The reliability is higher.

On the above embodiments, the lens 11 can use glass material or plastic material. Comparing those two, the former is superior to the latter in the side of sensibility of high temperature on the one side. The weight of the latter is lighter relatively. Hence, the technician of the field and make corresponding choice according to the actual application environment of lens assembly 1.

Figure 2:
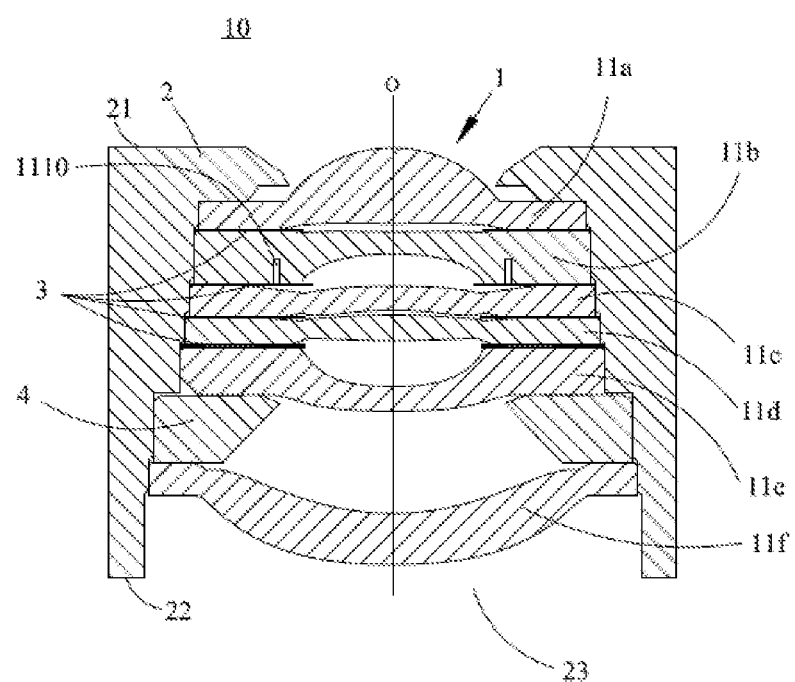
FIG. 2 is an illustrative cross-sectional view of a lens module using the lens assembly in FIG. 1.

Shown as FIG. 2, the present disclosure provides a lens module 10. The lens module 10 includes a lens barrel 2 and a lens assembly he lens barrel 2. The lens assembly is the lens assembly 1 described above. The above-mentioned disclosure can reduce the stray light in the lens assembly 1 and improve the imaging quality of lens module 10.

The lens module 10 includes the lens assembly 1, an anti-dazzling screen 3 and a shading board 4. The lens assembly 1 include six lenses including a first lens 11a, a second lens 11b, a third lens 11c, a fourth lens 11d, a fifth lens 11e and a sixth lens 11f arranged one by one along the direction of optical axis O. The shading unit 12 is set in the second lens 11b. Of course, according to difference of the parameters of the lens module 10, such as pixel demands, the shading unit 12 can be set in any one or several lens of the first lens 11a, the second lens 11b, the third lens 11c, the fourth lens 11d, the fifth lens 11e and the sixth lens 11f.

The anti-dazzling screen 3 and the shading board 4 are arranged respectively between any two adjacent lenses.

The set anti-dazzling screen 3 or the shading board 4 further abuts against the shading unit 12, so that the anti-dazzling screen 3 or the shading board 4 can work as built-in fitment for the shading unit 12 at the same time to prevent the falling of shading unit 12.

Besides, the lens barrel 2 works as the supporting body of the lens assembly 1, the anti-dazzling screen 3 and the shading board 4. In addition, the lens barrel 2 is used for protecting the lens assembly 1. The lens barrel 2 has a first surface 21 and a second surface 22 distributed along the extension direction of optical axis O. An accommodation cavity 23 of the lens barrel 2 is formed between the first surface 21 and the second surface 22. The lens assembly 1 is received in the accommodation cavity 23. Accordingly, a gap is left between the sixth lens 11f and the second surface 22. When the lens module 10 is installed in electronic equipment, the gap can be left between other parts in the electronic equipment and the sixth lens 11f to avoid touching with the sixth lens 11f for protecting the lens assembly 1.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A lens assembly, including:
    at least one lens having a central part used for imaging and an edge part around the central part;
    a shading unit in the at least one lens; wherein
    the edge part depressing from an image side surface to an object side surface and forming a concave part for positioning the shading unit;
    the shading unit extending from an image side surface of the lens to an object side surface along a direction parallel to an optical axis of the lens assembly;
    an anti-dazzling screen or a shading board disposed under the shading unit, the anti-dazzling screen or the shading board is fixed to the edge part of the lens and covers the concave part to abuts against the shading unit to enforce the shading unit.

2. The lens assembly as described in claim 1, wherein an axis of the shading unit is co-linear with the optical axis and the shading unit is arranged in the edge part close to one side of the optical axis.

3. The lens assembly as described in claim 1, wherein the shading unit is made of metal or plastic.

4. The lens assembly as described in claim 1, wherein the shading unit is a black shading unit made by black plastics or a metal shading unit by darkening process.

5. The lens assembly as described in claim 1, wherein the lens is integrally formed with the shading unit.

6. The lens assembly as described in claim 1, wherein the lens is made of glass or plastic.

7. A lens module, including:
    a lens barrel;
    a plurality of lens assemblies accommodated in the lens barrel, the lens assemblies comprising at least a first lens assembly and a second lens assembly, the second lens being same as the lens assembly as described in claim 1.

* * * * *